Patented May 3, 1932

1,856,263

UNITED STATES PATENT OFFICE

EBENEZER EMMET REID, OF BALTIMORE, MARYLAND, ASSIGNOR TO E. I. DU PONT DE NEMOURS & COMPANY, OF WILMINGTON, DELAWARE, A CORPORATION OF DELAWARE

METHOD OF PRODUCING ALKALI METAL SALTS OF ORGANIC ACIDS

No Drawing.   Application filed February 28, 1929.   Serial No. 343,550.

This invention relates to the production of salts, and more particularly to a process of producing alkali metal salts of organic acids by the action of caustic alkalies on alcohols.

It has previously been proposed to dehydrogenate aliphatic alcohols to form salts of the fatty acids by treating the alcohols with caustic alkalies but the yields, especially of the lower alcohols, have been so low, such a high excess of alkali has been necessary, the heating has required such long periods, and the accompanying condensation of the alcohols to form resinous materials has been so objectionable, as to make the process impractical commercially.

I have discovered that these difficulties can be overcome by carrying out the reaction at temperatures above 300° C. and pressures in excess of 100 atmospheres.

It is therefore an object of this invention to provide an improved process for the production of alkali metal salts of organic acids from alcohols.

It is another object of this invention to produce high yields of alkali metal salts of organic acids in short periods of time and without the formation of resinous materials.

It is a further object of this invention to produce a continuous method of producing alkali metal salts from alcohols.

With the above and other objects in view, which will be apparent as the description proceeds, I have set forth my invention in the following specification and have included the following examples by way of illustration and not as a limitation.

*Example 1.—Sodium acetate. Alcohol caustic mol ratio 2.97:1*

80 grams of solid C. P. sodium hydroxide and 290 grams of 92.5% by weight ethyl alcohol were heated for 2.75 hours in a steel tube capable of withstanding high pressures. At 320° C. the pressure built up rapidly to 6000 pounds per square inch, where it was maintained by bleeding off gas and alcohol vapor. The temperature range during the reaction period was 320 to 330° C. 270 grams of solid were removed. This contained 0.30% free sodium hydroxide. It was distilled with a nonvolatile acid and the distillate analyzed for acetic acid. 98.9% of the caustic was thus converted to sodium acetate. The reaction tubes in this and the following examples were mounted on a rocking device which supplied moderate agitation.

*Example 2.—Sodium acetate. Alcohol caustic mol ratio 1:1*

80 grams of C. P. sodium hydroxide and 100 grams of 92.5% ethyl alcohol were heated at 355° C. for 3 hours. A pressure of 3400 pounds per square inch was developed. 2.59 cubic feet of gas (20° C.) with a hydrogen content of 88.7% were formed. 145 grams of solid material were recovered. This contained 18.2% free sodium hydroxide and it was found that only 67% of caustic was converted to acetate.

*Example 3.—Sodium acetate. 20% caustic solution*

30 grams of C. P. sodium hydroxide and 120 grams of water were heated in a steel tube to 380° C. At this temperature 120 cc. of 92.5% ethyl alcohol were injected by means of a small pump. The pressure immediately jumped from 2000 to 4000 pounds where it remained constant. The total reacting time was 30 minutes. 175 grams of a clear solution were recovered. This was shown by analysis to contain 0.34% free sodium hydroxide, no sodium carbonate, and 34% sodium acetate. This amounts to a conversion of 97.1% of the original alkali.

*Example 4.—Sodium propionate*

80 grams of C. P. sodium hydroxide and 132 grams of normal propyl alcohol were heated for 3.5 hours at 350° C. at a pressure of greater than 100 atmospheres. 198 grams of solid material, with a free sodium hydroxide content of 12.25%, were recovered. Due to the low alcohol-alkali ratio, the conversion to sodium propionate was low and amounted to only 69.7%.

*Example 5.—Sodium butyrate*

50 grams C. P. sodium hydroxide and 300 grams normal butanol were heated at 330° C.

until the pressure rise, due to hydrogen formation, ceased at 4200 pounds. This required about 1 hour. 96.3% of the hydroxide was converted to sodium butyrate.

*Example 6.—Potassium caprylate*

100 grams 86.7% potassium hydroxide and 250 grams octanol were heated at 340° C. for 1.75 hours. The maximum pressure was 4600 pounds. The product was a soapy mass, which was extracted with ether and the residue heated above the fusion point to drive off the water. Analysis of the 250 grams thus obtained showed 0.33% potassium hydroxide and 83.9% potassium caprylate.

The high yields disclosed in this invention depend upon the application of elevated temperatures, and consequently of high pressures, that is, temperatures above 300° C. and pressures in excess of 100 atmospheres, as well as intimate contact of the reacting materials. Although temperatures between 300 and 400° C. are desirable, other elevated temperatures are satisfactory provided the mixture being heated is kept in the liquid state.

Proper contact between reacting materials may be accomplished by internal agitation, as in an autoclave, or by external agitation of the entire pressure vessel. It may also be accomplished as a continuous process by introducing alcohol and aqueous alkali solution, by means of suitable pumping devices, into a heated, pressure resisting coil, the rate of input and length of coil being so adjusted as to give adequate time of contact between alcohol and alkali. The liquid and gaseous products may then be led through a condenser, the salt solution drawn off, and the uncondensed hydrogen removed at a rate determined by the pressure desired throughout the system. In fact, any method whereby the acting substances are brought into intimate contact will expedite the reaction.

Although considerable variation in the quantities of caustic and alcohol will give improved yields of salt, I prefer to use 20% solutions of caustic and twice the theoretical quantities of alcohol, as these proportions prevent the presence of any discoloring matter and decrease or eliminate the formation of carbonates, as well as permit the salts to be crystallized from the solutions with a high grade of purity. When substantially less than twice the theoretical quantity of alcohol is used the resulting product includes free alkali, which is an objectionable impurity in salts. The decrease or elimination of carbonates is also aided by cutting down the reaction period. Where these precautions are not observed carbonates may be present in percentages up to approximately five per cent. If no water is employed the products of the invention are recovered as an intimate mixture of the salt and excess alcohol.

Although ethyl alcohol and sodium hydroxide are used in the preferred embodiment of my invention, its application is not limited to their use as it is of general application for the production of alkali metal salts of organic acids from alcohols by caustic dehydrogenation. It is especially useful, however, for the oxidation of alcohols having from 2 to 8 carbon atoms. It is not as useful for the oxidation of methyl alcohol as decomposition of the formate to carbonates predominates. Likewise, it is not as useful for the oxidation of alcohols of very high molecular weight unless water solutions of the alkali are used, as the increase in yield is not as marked with such alcohols and the advantage of my invention for use with higher alcohols is mainly in the decreased quantity of alkali which will effect a high conversion.

It will therefore be apparent that I have developed a new method of producing alkali metal salts of organic acids which results in practically quantitative conversion of the alkali, cutting down the reaction period to a small fraction of that heretofore necessary with a consequent reduction in heat consumption, and the almost complete elimination of undesirable resinous materials.

Furthermore, by the use of aqueous alkali solutions, as indicated in Example 3, it is possible to effect a continuous introduction of raw materials and removal of products in the liquid state.

My invention also furnishes an easy and convenient method for the preparation of the fatty acids as the salts prepared as indicated herein can be treated to liberate the fatty acids by well known means.

The attendant hydrogen, which is liberated in the reaction involved in the present invention, is obtained in a relatively pure state and constitutes a valuable by-product.

As many apparently widely different embodiments of this invention may be made without departing from the spirit and scope thereof, it is to be understood that I do not limit myself to the specific embodiments thereof except as defined in the appended patent claims.

I claim:

1. The process of producing an alkali metal salt of an organic acid, which comprises dehydrogenating a saturated aliphatic alcohol with a caustic alkali at a temperature of greater than 300° C. and a pressure of greater than 100 atmospheres.

2. The process of claim 1, in which the mixture is agitated during heating.

3. The process of claim 1, in which the yield is greater than 65% by heating for not more than 4 hours.

4. The process of claim 1, in which the yield is greater than 80% by heating for not more than 4 hours.

5. The process of claim 1, in which at least twice the theoretical quantity of alcohol is used and a yield of more than 95% is obtained by heating for not more than 3 hours.

6. The process of claim 1, in which the alcohol used contains not less than 2 and not more than 8 carbon atoms.

7. The process of claim 1, in which ethyl alcohol is used.

8. The process of claim 1, in which ethyl alcohol is used and a yield of greater than 65% is obtained by heating for not more than 4 hours.

9. The process of claim 1, in which ethyl alcohol is used and a yield of greater than 95% is obtained by heating for not more than 3 hours.

10. The process of claim 1, in which a solution of caustic alkali is used.

11. The process of producing an alkali metal salt of an organic acid, which comprises dehydrogenating a saturated aliphatic alcohol with a caustic alkali at a temperature of greater than 320° C. and a pressure of greater than 200 atmospheres.

12. The process of claim 11, in which the mixture is agitated during heating.

13. The process of claim 11, in which the yield is greater than 65% by heating for not more than 4 hours.

14. The process of claim 11, in which at least twice the theoretical quantity of alcohol is used and a yield of more than 95% is obtained by heating for not more than 3 hours.

15. The process of claim 11, in which ethyl alcohol is used.

16. The process of claim 11, in which a solution of caustic alkali is used.

17. The process of producing an alkali metal salt of an organic acid, which comprises dehydrogenating ethyl alcohol with sodium hydroxide to give a yield of greater than 95% by heating at a temperature of greater than 320° C. and a pressure of greater than 200 atmospheres for not more than 3 hours.

18. The process of producing sodium acetate, which comprises heating an aqueous solution of sodium hydroxide to above 320° C., injecting at least twice the theoretical quantity of ethyl alcohol, and reacting for 30 minutes, at a pressure of greater than 200 atmospheres, to give a conversion of greater than 97%.

19. The process of producing sodium acetate, which comprises heating 30 parts by weight of sodium hydroxide and 120 parts by weight of water to 380° C., injecting 120 parts by weight of 92.5% ethyl alcohol, and reacting for 30 minutes, at a pressure of greater than 200 atmospheres, to give a conversion of greater than 97%.

In testimony whereof, I affix my signature.

EBENEZER EMMET REID.